Sept. 11, 1923.  1,467,742

D. E. TURNER

VALVE FOR INTERNAL COMBUSTION ENGINES

Filed Sept. 2, 1919   3 Sheets—Sheet 1

Sept. 11, 1923.
D. E. TURNER
1,467,742
VALVE FOR INTERNAL COMBUSTION ENGINES
Filed Sept. 2, 1919   3 Sheets-Sheet 2
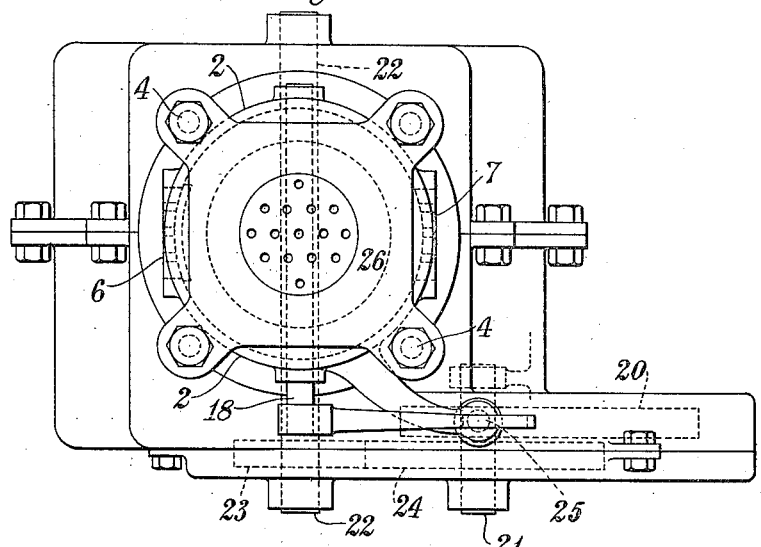
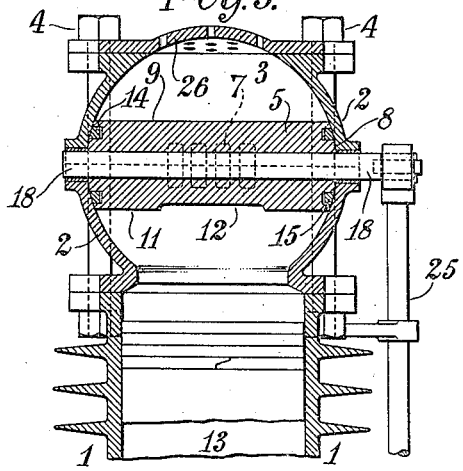
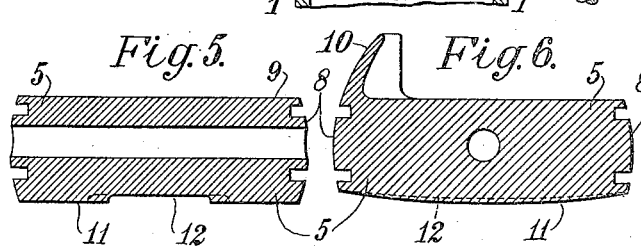
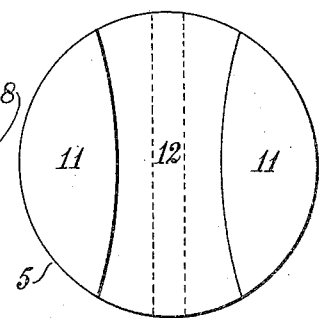
Inventor
D. E. Turner

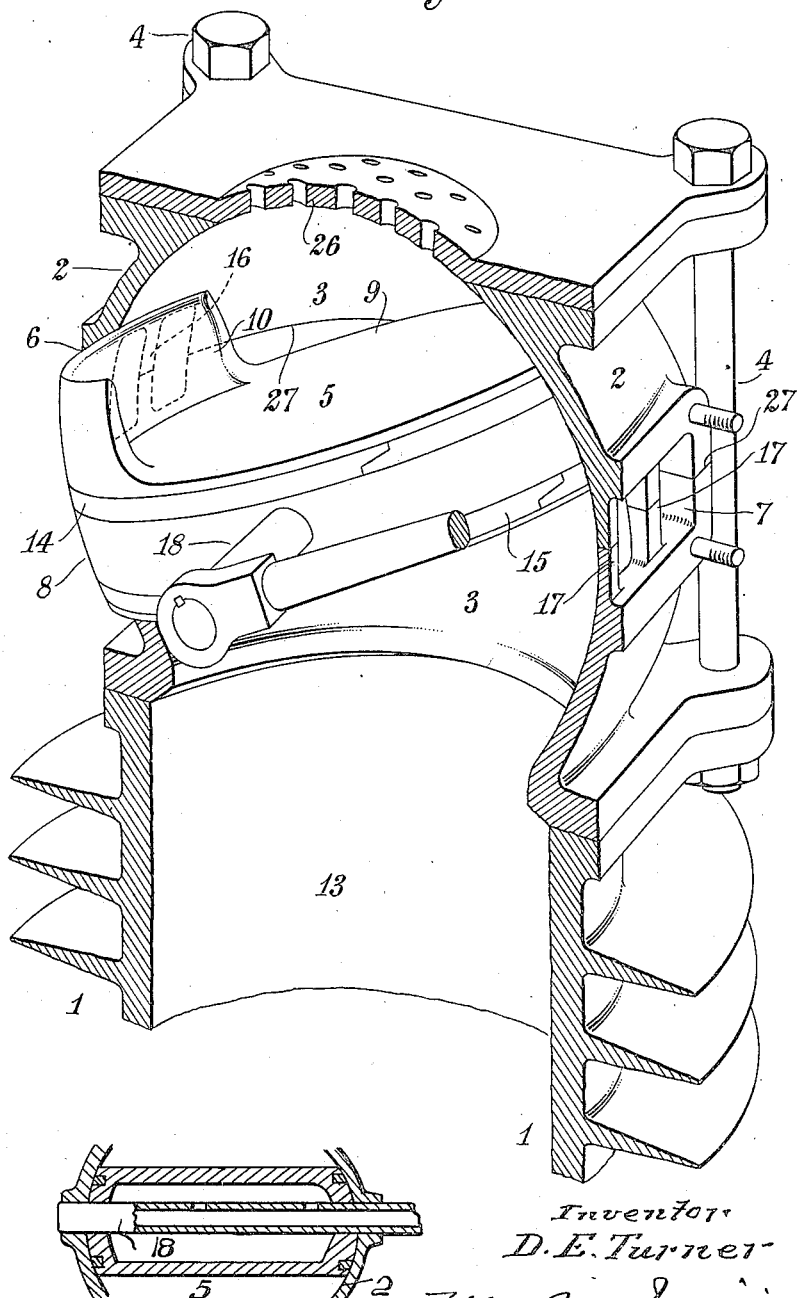

Patented Sept. 11, 1923.

1,467,742

UNITED STATES PATENT OFFICE.

DAVID EDWARD TURNER, OF HAMPSTEAD, LONDON, ENGLAND.

VALVE FOR INTERNAL-COMBUSTION ENGINES.

Application filed September 2, 1919. Serial No. 321,145.

*To all whom it may concern:*

Be it known that I, DAVID EDWARD TURNER, a subject of His Majesty the King of England, and resident of Jack Straw's Castle Limited, Hampstead, in the county of London, Kingdom of England, have invented certain new and useful Valves for Internal-Combustion Engines, of which the following is a specification.

This invention relates to internal combustion engines of the kind having a spherical or part spherical cylinder end and a correspondingly formed valve adapted to oscillate therein. As heretofore constructed such valves have been untrunnioned or loosely mounted in the valve casing and held against the valve casing by a spring or springs, suitable means being employed to oscillate the valve to control the admission of fuel to and the exhaust of the products of combustion from the cylinder.

According to the present invention the cylinder or each cylinder of an internal combustion engine is provided with a spherical end within which is arranged a correspondingly shaped and trunnioned valve which is adapted to be oscillated to control the admission of fuel to and the escape of the exhaust products of combustion from the cylinder. The trunnion is disposed and supported in a plane at right angles to the axis of the cylinder. The valve is provided with a piston ring or piston rings to maintain a fluid tight joint between the valve and its casing the said piston ring or piston rings being mounted in a recess or recesses in the spherical surface of the valve and preferably arranged in a plane or planes at right angles to the axis through the cylinder when the valve is in the central position. The valve is provided with an upstanding portion preferably on diametrically opposite sides or periphery round the upper face or side of the valve so as to prevent flaming and also to provide a more or less balanced valve.

The end of the cylinder is split to allow the valve to be inserted in place in the valve casing, the upper face of the valve being of any suitable form, plane, convex or concave. The lower face of the valve may be plane or of convex curvature outwardly the curvature being in the direction of the inlet and exhaust openings to and from the cylinder.

A portion of the lower part of the oscillating valve disc may be cut away or the valve disc may be suitably recessed adjacent the openings aforesaid so as to give a quicker entry for the fuel into the cylinder and a quicker exhaust from the cylinder. For example the said convex curved lower face of the valve disc may be formed with two convex surfaces in the direction of the inlet and exhaust openings the outer curved surface vanishing into the inner or upper curved surface at any suitable point between the centre line through the disc and parallel with the line of the openings and the periphery of the disc.

The radius of curvature of the spherical or part spherical valve chamber may be greater than, equal to, or less than the bore of the cylinder.

I will describe with reference to the accompanying drawings a construction in accordance with the present invention, but I do not limit myself to the precise construction described and illustrated.

Figure 2 is a plan of Figure 1, and Figure 3 is a vertical section through the spherical cylinder end and valve at right angles to Figure 1.

Figure 4 is a sectional perspective view of the cylinder end and valve in position therein.

Figures 5 and 7 are respectively a cross section and an inverted plan of part of the valve and Figure 6 is a section at right angles to Figure 5.

Fig. 8 is a sectional view, illustrating a means for circulating a cooling medium through the valve.

Figure 1:
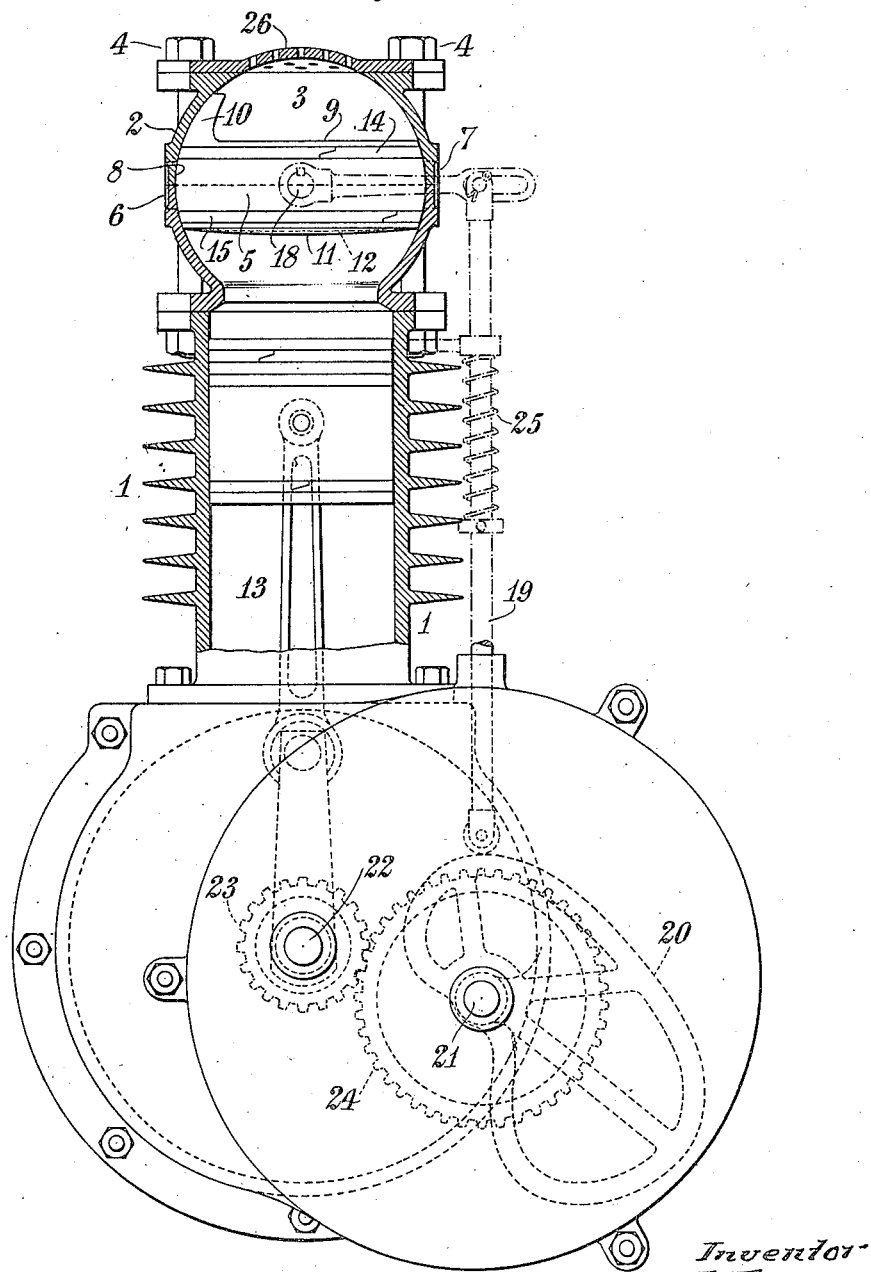
Figure 1 is an elevation partly in section of a cylinder end and valve in accordance with the present invention.

Referring to the drawings, the rear end of the cylinder 1 is provided with a casing 2 having a hollow spherical interior or chamber 3. The casing 2 which is split as at 27 may, as shown in the drawings be removably attached as by bolts 4 to the cylinder, and the two parts of the casing may be bolted together and to the cylinder end. In the chamber 3 is arranged a correspondingly shaped valve 5 which is oscillated to control the admission of fuel by the inlet 6 to the cylinder and the escape of the products of combustion from the cylinder 1 by the opening 7.

As shewn in the drawings the valve is in the form of a disc having a spherical or part spherical contour as at 8. The oscillating valve disc may be any convenient portion of a sphere having the upper face 9 preferably provided with an upstanding projecting portion 10 which covers the fuel inlet opening and prevents the inlet of fuel to the rear face of the valve when the exhaust port is open partly and wholly, thus preventing more or less a continuous flame in that portion of the casing above the valve.

It is to be noted that there is at all times a space in the chamber 3 above the valve 5, and that this space, in the absence of the part 10, would be freely open to the fuel inlet opening 6 when the valve is in the position to open the exhaust port 7. This would undoubtedly admit volatile fuel vapor to the chamber 3 above the valve while the valve was in an exhaust opening position, and if, as contemplated, the cover of the casing were perforated, as shown, such admitted fuel would be an entire waste. Further, it would be impossible on even a slight leakage of the valve to prevent igniting this fuel in the upper portion of the chamber 3, hence maintaining a flame on the upper side of the valve. With the deflector 10 however, the inlet port is completely closed in all positions of the valve other than that position designed to admit fuel to the cylinder, and hence the possible accumulation of fuel in the upper portion of the chamber 3, with the certainty of wastage and the possibility of flaming is entirely avoided.

The lower face 11 of the oscillating disc valve may be of convex curvature outwardly the curvature being in the direction of the inlet opening 6 and the exhaust opening 7. If so desired the convex curved or lower face of the oscillating disc valve may be formed of two convex surfaces, Figures 5, 6 and 7, that is, the convex curved surface hereinbefore explained and a central portion 12, the direction of curvature being toward the inlet and exhaust openings from the cylinder. The outer convex curved surface 11 preferably vanishes into the inner convex curved surface adjacent the globular or spherical periphery of the disc valve.

The inner radius of curvature of the spherical or part spherical end of the cylinder may be greater than, equal to, or less than the bore 13 of the cylinder, and the outer peripheral surface of the valve disc is provided with piston rings 14, 15 or other suitable means so as to obviate escape of the fluid from the cylinder while the valve is operating unless through the proper channels or ports. As shown more particularly in Figures 3 and 4 the inlet and exhaust openings are non-continuous, the upper or outer and lower or inner edges of the two openings being connected by webs 16, 17, Figure 4, so as to offer a continuous surface to the movement of the valve and prevent the piston rings jumping out.

The valve is trunnioned as at 18, the admission of the fuel to and the exhaust of the products of combustion from the cylinder being controlled by a simple oscillating motion imparted to the valve disc working fluid tight in the cylinder end. The valve disc may be connected by the trunnion 18 passing fluid-tight, if desired, through the cylinder to an operating rod 19 outside the cylinder, the latter rod 19 being actuated by a cam 20 mounted on the half speed shaft 21 which is driven from the engine shaft 22 by gearing 23, 24.

The cam 20 is preferably adapted to effect the movement of the valve in both directions against the action of a spring 25 or springs, and the cam may be of the cam race type so that all the movement of the oscillating valve can be effected positively without the use of a spring or springs.

The outer end of the valve chamber may be closed, or open as desired, if open a suitable perforated cover 26 or a wire gauze cover may be employed to permit of the free circulation of air to cool the valve. The cover may, as shown, be curved on its under surface to conform to the curvature of the valve chamber and to form a working surface for the upstanding projecting portion 10 on the valve.

The cam effecting the movement of the valve and having a suitably shaped cam race on either of its side faces or on its peripheral surface or part thereof or a peripheral surface secured thereto may be formed as a gear wheel and driven direct from the main shaft of the engine.

As the trunnioned valve may be hollow a construction as hereinbefore described permits of the inlet of fuel to and the exhaust from the cylinder being controlled by an air cooled valve or water cooled valve having a simple oscillating trunnioned movement the trunnion being disposed at right angles to the axis of the cylinder. The cooling liquid may be delivered to the valve through the trunnion which would then be made in the form of a hollow spindle, as clearly shown in Fig. 8.

The action is as follows:—The valve is oscillated on one side so that the lower outer edge thereof is adjacent the upper edge or approximately so of the inlet opening at which time fuel is admitted to the cylinder. The piston travelling outward draws the fuel into the cylinder. The valve is then operated at the end of the outward stroke of the piston or at any predetermined point thereof so as to cut off the fuel supply, the valve disc being maintained in this position by the cam until compression and ignition take place. At any suitable time after ignition the valve or valve disc is oscillated by the action of the cam 20 in the opposite direction so as to open the exhaust outlet from the cylinder as shown in Figure 4, this outlet being subsequently closed by the oscillation of the valve in the opposite direction so as to open the inlet opening for fuel to the cylinder.

What I claim is:—

1. An internal combustion engine having a cylinder provided with a substantially spherical chamber formed with inlet and exhaust ports in the wall thereof, a part spherical valve trunnioned to operate in said chamber and control said ports, and means carried by the valve to maintain the inlet port closed when the valve is in position to open the exhaust port to the cylinder, whereby to prevent admission of fuel to that portion of the chamber beyond the valve relative to the cylinder.

2. An internal combustion engine having a cylinder provided with a substantially spherical chamber formed with inlet and exhaust ports in the wall thereof, a part spherical valve trunnioned to operate in said chamber and control said ports, said valve being formed with an upstanding wall adapted to cover and maintain the inlet port closed when the valve is in position to open the exhaust port to the cylinder, whereby to prevent admission of fuel to that portion of the chamber beyond the valve relative to the cylinder.

3. An internal combustion engine having a cylinder provided with a substantially spherical chamber formed with inlet and exhaust ports in the wall thereof, a part spherical valve trunnioned to operate in said chamber and control said ports, that portion of the chamber above the valve relative to the cylinder being vented to the atmosphere and means operative beyond the casing for operating the valve.

4. An internal combustion engine having a cylinder provided with a substantially spherical chamber formed with inlet and exhaust ports in the wall thereof, a part spherical valve trunnioned to operate in said chamber and control said ports, that portion of the chamber above the valve relative to the cylinder being vented to the atmosphere, means carried by the valve to close the vented portion of the chamber against the inlet port when the valve is in a position to establish communication between the cylinder and exhaust port, and means for operating the valve.

5. An internal combustion engine having a cylinder provided with a spherical chamber formed with inlet and exhaust ports, a hollow part spherical valve journaled in said chamber to control said ports, means for admitting atmosphere to the interior of said hollow valve, and means for operating the valve.

6. An internal combustion engine having a cylinder provided with a substantially spherical chamber formed with ports in the wall thereof, a part spherical valve trunnioned to operate in said chamber and control said ports, bars bridging said ports and conforming on their inner edges to the interior shape of the chamber to provide guides for the valve in crossing the ports, and a member carried by the valve to maintain one of said ports closed when the valve is in position to open the other port.

In testimony whereof I have hereunto signed my name.

DAVID EDWARD TURNER.